Patented Aug. 19, 1952

2,607,721

UNITED STATES PATENT OFFICE 2,607,721

SILVER RECOVERY FROM SODIUM THIOSULFATE SOLUTIONS

Bernard H. Holman, Rochester, N. Y., assignor to Eastman Kodak Company, Rochester, N. Y., a corporation of New Jersey No Drawing. Application June 25, 1949, Serial No. 101,481

4 Claims. (Cl. 204—109)

The present invention relates to recovering silver from solutions containing substantial quantities of gelatin, silver sulfides, baryta sizings and paper fibers, and more particularly to an improved method of recovering plateable silver from such solutions by electrolysis.

It is now customary in processes for recovering silver from waste photographic paper and the like to dissolve the silver from the base by the use of so-called hypo (sodium thiosulfate) solutions. The silver in solution is then recovered electrolytically. While the silver is being leached out of the paper, a substantial amount of gelatin from the emulsion is also dissolved. This solution will also contain substantial quantities of non-plateable silver sulfides, baryta and fibers from the paper. The gelatin causes difficulty in the plating cells by coating the electrodes onto which the silver is plated, and this coating reduces the electrical current flow and consequently reduces the quantity of silver which is plated out of the solution per unit of time. The other inclusions in the solution also disadvantageously affect the silver recovery process.

In plating out silver from the hypo solution, it is possible to increase the rate of plate out by increasing the pH of the solution. However, this increase in pH is limited since if the pH is increased too much, decomposition of the hypo solution will occur and the resulting decomposition products and side reaction products further interfere with obtaining the desired silver plate.

An object of the present invention is, therefore, an improved process of plating silver from hypo solutions containing substantial quantities of gelatin and other substances which may interfere with the plating operation.

Another object of the invention is a process of plating silver from hypo solutions containing substantial quantities of gelatin whereby an increase in current density, and increase in rate of plate out is possible without producing undesirable results. Other objects of the invention will be apparent from the following description:

In accordance with my invention these and other objects are attained by dissolving the silver compounds from the photographic paper or other element by employing sodium thiosulfate solution. The resulting silver containing solution will contain substantial quantities of gelatin as well as baryta, silver sulfides and paper fibers, which were present in the photographic element. I have now found that by adding to this solution, before the electroplating operation, 0.02% to 4.0% of condensation products of aldehydes and naphthalene sulfonic acids substantially all of the gelatin, baryta, silver sulfides and other such inclusions will precipitate out of the hypo solution. The hypo solution which contains the free silver is then separated from the precipitate and conducted to the plating cells and the silver is plated therefrom by any suitable method known in the art. The total plating efficiency is increased since the removal of the gelatin and other inclusions substantially reduces extraneous deposits on the cathode. It also permits the plating operation to be conducted at a higher pH as the lower amount of turbidity in the solution allows more decomposition of the hypo solution to take place without reaching a critical point. My novel process permits up to 10% increase in the rate of plate out of the silver from the solution.

The advantage of conducting the plating operation at a higher than normal pH is evident when one understands how gelatin functions in an electrolytic bath. Gelatin is an "amphoteric" colloid whose particles can behave in solution as though positively or negatively charged according to the acidity or alkalinity of the solution. In a strongly acid solution, the gelatin "ion" moves to the cathode and is deposited with the silver, the properties and appearance of which it modifies profoundly. When the solution contains only traces of gelatin, the deposit is firm and adherent and varies from a creamy white matte surface to a pure white burnished surface of extreme brilliancy. As the gelatin products are increased the deposit becomes bluish-white with a brilliant specular reflection. Analysis reveals up to 96% silver and 1 to 4% gelatin and water. The mechanical strength is poor and the contraction on drying is often sufficient to strip the metal from the cathode. Further increases in the gelatin content of the solution yield dark blue or black deposits largely contaminated with sulfide and when this happens the hypo solution becomes badly discolored. With a substantial quantity of gelatin present in the plating bath there is indiscriminate absorption of gelatin with the silver which prevents the development of any but the most isolated fragments of crystal lattice. If the plating operation is conducted at a higher pH the "amphoteric" gelatin colloid tends to plate out on the anode and does not interfere with the plate on the cathode. The pH of the bath of the present invention may be made more basic by adding $Na_2SO_3$ thereto.

The condensation products I prefer to employ to precipitate gelatin and other inclusions from the hypo solution are the "Tamols." They are condensation products of an aldehyde such as formaldehyde with naphthalene sulfonic acids, see Ullman "Enzyklopädie der technischen Chemie," 2nd Auflage (1930) 5. Bank, pages 84 and 686 and H. Wagnor "Chemiker Zeitung," vol. 46 (1922), page 801. The preferred product "Tamol NNO," is a relatively neutral amorphous solid having no odor. When dissolved in solution at low concentrations, it gives an essentially clear colorless solution without odor and does not decompose on standing.

A solution of "Tamol NNO" does not readily foam even with a high degree of agitation and the foam, if any, breaks almost instantaneously.

My present invention can be effectively employed in many different types of plating methods for plating silver out of hypo solutions containing gelatin. The invention is particularly adaptable for use in connection with the process and apparatus shown in Hickman Patent 1,954,316 of April 10, 1934.

It has been found that opacities are improved approximately 200% with "Tamol" in the desired range of concentration in about one-sixtieth of the time required to settle out the equivalent opacity in untreated solutions. Thus, an advantage of the present invention is that solutions can be conducted to the plating baths much sooner and obviate a prolonged storage in settling tanks.

I have found that the pH of the solution being treated with this agent should be within the ranges of 3.0 to 5 and 7.0–9.0. For some reason, not well understood, the agent will not satisfactorily operate at a pH of from above 5 to below 7.

*Example 1*

The following is a typical example of a hypo solution containing dissolved photographic layers from photographic paper:

| | Parts |
|---|---|
| Hypo | 80 |
| Sodium bisulfite | 8 |
| Silver (metal) | 3 |
| Gelatin, baryta, paper fibers, etc | 1 |
| Water to make up to 1000 parts. | |

When this solution is treated with a .02% "Tamol NNO" substantially all of the gelatin is precipitated. The solution without the gelatin precipitate is transferred to the plating apparatus described in Hickman et al. Patent 1,954,316, and silver is electrolytically plated from the bath until only one part of silver per thousand remains in the solution.

*Example 2*

Another typical example of a hypo solution containing dissolved photographic layers from photographic paper which is to be treated electrolytically to recover free silver is the following:

| | Parts |
|---|---|
| Hypo | 80 |
| Sodium sulfite | 22 |
| Silver (metal) | 3 |
| Gelatin, baryta, paper fibers, etc | 1 |
| Water to make up to 1000 parts. | |

The pH of this solution is 7.5 and 0.02% of "Tamol NNO" was added to precipitate the gelatin from the solution. The precipitate was separated from the solution and transferred to plating apparatus mentioned in connection with Example 1, and silver was electrolytically plated from the bath until only one part of silver per thousand remains in the solution.

Because of the beneficial effect of removing gelatin and other inclusions normally found in these hypo solutions, a 10% increase in the plating rate occurs and the plate is firm and contains substantially none of the impurities found in the solution.

What I claim and desire to secure by Letters Patent of the United States is:

1. The process of increasing the rate of electroplating silver from hypo solutions containing silver, nonplateable silver sulfides, baryta, gelatin, and paper fibers without decomposition of the hypo solution which comprises precipitating substantially all of the nonplateable silver sulfides, baryta, gelatin and paper fibers from the solution prior to the electroplating operation by adding thereto a precipitating agent comprising a condensation product of an aldehyde and a naphthalene sulfonic acid separating the solution from the precipitate, and electroplating silver from the solution while maintaining the pH thereof within a range selected from the pH ranges of 3.0 to 5 and 7.0 to 9.0 at which residual gelatin will plate out on the anode, said pH ranges being normally those at which decomposition of the hypo solution occurs and gelatin would plate onto the cathode with the recoverable silver were the solution not treated with said agent.

2. The process of increasing the rate of electroplating silver from hypo solutions containing silver, nonplateable silver sulfides, baryta, gelatin, and paper fibers without decomposition of the hypo solution which comprises precipitating substantially all of the nonplateable silver sulfides, baryta, gelatin and paper fibers from the solution prior to the electroplating operation by adding thereto 0.02%–4% of a precipitating agent comprising a condensation product of an aldehyde and a naphthalene sulfonic acid separating the solution from the precipitate, and electroplating silver from the solution while maintaining the pH thereof within a range selected from the pH ranges of 3.0 to 5 and 7.0 to 9.0 at which residual gelatin will plate out on the anode, said pH ranges being normally those at which decomposition of the hypo solution occurs and gelatin would plate onto the cathode with the recoverable silver were the solution not treated with said agent.

3. The process of increasing the rate of electroplating silver from hypo solutions containing silver, nonplateable silver sulfides, baryta, gelatin, and paper fibers without decomposition of the hypo solution which comprises precipitating substantially all of the nonplateable silver sulfides, baryta, gelatin and paper fibers from the solution prior to the electroplating operation by adding thereto 0.02% of a precipitating agent comprising a condensation product of an aldehyde and a naphthalene sulfonic acid separating the solution from the precipitate, and electroplating silver from the solution while maintaining the pH of the solution at 3.0, said pH being normally one at which decomposition of the hypo solution occurs and gelatin would plate onto the cathode were the recoverable silver not treated with said agent.

4. The process of increasing the rate of electroplating silver from hypo solutions containing silver, nonplateable silver sulfides, baryta, gelatin, and paper fibers without decomposition of the hypo solution which comprises precipitating substantially all of the nonplateable silver sulfides, baryta, gelatin and paper fibers from the solution prior to the electroplating operation by adding thereto 0.02% of a precipitating agent comprising a condensation product of an aldehyde and a naphthalene sulfonic acid separating the solution from the precipitate, and electroplating silver from the solution while maintaining the pH of the solution at 7.0, said pH being normally one at which decomposition of the hypo solution occurs and gelatin would plate onto the cathode were the recoverable silver not treated with said agent.

BERNARD H. HOLMAN.

REFERENCES CITED

The following references are of record in the file of this patent:

UNITED STATES PATENTS

| Number | Name | Date |
| --- | --- | --- |
| 1,857,507 | Hickman et al. | May 10, 1932 |
| 1,954,316 | Hickman et al. | Apr. 10, 1934 |
| 2,205,792 | Ham | June 25, 1940 |

OTHER REFERENCES

Synthetic Tannins by Georg Grasser, published by Crosley, Lockwood and Sons, London, 1922, pages 55 to 57.